Aug. 25, 1953                J. H. T. LEDRUT                2,650,219
    REACTION PRODUCT OF ANTIPYRINE ALDEHYDE, p-AMINOBENZENE
            SULFONAMIDE AND SODIUM BISULFITE
                    Filed Sept. 18, 1950
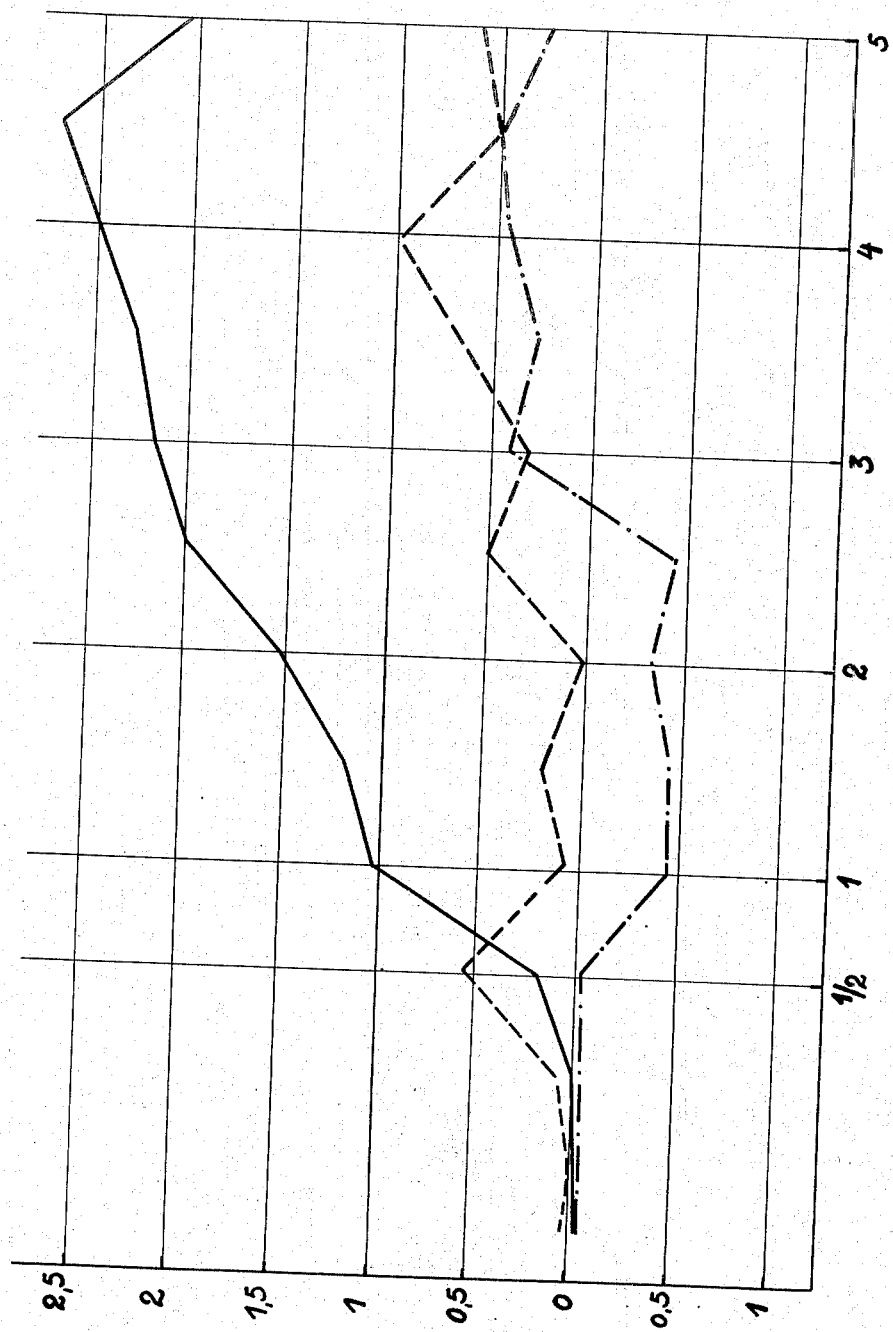
INVENTOR.
J. H. T. LEDRUT
BY Wenderoth, Lind & Ponack
ATTORNEYS Patented Aug. 25, 1953

2,650,219

UNITED STATES PATENT OFFICE 2,650,219

REACTION PRODUCT OF ANTIPYRINE ALDEHYDE, p-AMINOBENZENE SULFONAMIDE, AND SODIUM BISULFITE

Jules Henri Theophile Ledrut, Brussels, Belgium, assignor to Luxema S. A., Ixelles, Belgium, a company of Luxemburg Application September 18, 1950, Serial No. 185,462
In the Netherlands September 20, 1949

1 Claim. (Cl. 260—239.9)

The present invention relates to new compounds, obtained from a trisubstituted pyrazolone aldehyde, a primary amine selected from the class consisting of the monocyclic and bicyclic primary amines, and sodium bisulfite.

The new compounds according to the invention have the following general formula:

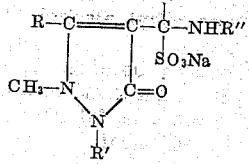

in which R is a radical selected from the class consisting of the methyl radical and the phenyl radical, R' is a monocyclic aryl radical and R'' is a radical selected from the class consisting of the monocyclic and bicyclic radicals having at least five carbon atoms.

It is known that the aldehydes of 1,2,3-trisubstituted pyrazolones and specially the aldehyde of 1-phenyl-2,3-dimethyl-5-pyrazolone or antipyrine aldehyde have antithermic properties. Moreover, it is also known that the para-aminobenzene sulfonamide has bacteriostatic properties with respect to certain microorganisms, such as Streptococcus, Staphylococcus, etc.

Various derivatives have been prepared from the 1,2,3-trisubstituted pyrazolones. The pharmacodynamic properties of these known derivatives were examined. Amongst these derivatives, the 1-phenyl-2,3-dimethyl-4-sulfonamido-5-pyrazolone was particularly studied (see E. H. Northey, The Sulfonamides and Allied Compounds, 1948, p. 260, Reinhold Publ. Corporation). It was found that this latter derivative does no more possess the antithermic properties of antipyrine, nor the bacteriostatic properties of the sulfonamide.

The bisulfite compounds of the Schiff's bases of 1,2,3-trisubstituted pyrazolone, obtained according to the present invention, have antithermic and bacteriostatic properties.

For example, the bisulphite compound of the Schiff's base obtained by reacting, in equimolecular proportions, antipyrine aldehyde with para-amino-benzene sulfonamide and sodium bisulphite, possesses very marked antithermic and bacteriostatic properties.

This compound, having the following general formula

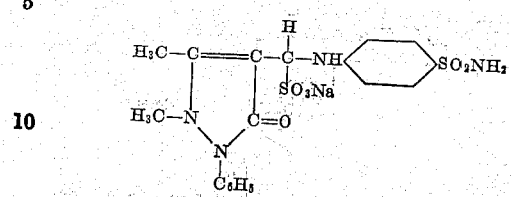

was subjected to pharmacodynamic tests, which will be briefly reported hereinafter,

1. Antithermic properties

Doses of 1 gr. and 0.5 gr. of the bisulphite compound, obtained from antipyrine aldehyde and para-amino-benzene sulfonamide, were orally administered to dogs (having a weight of 10 to 12 kilograms), half of hour after the administration of a dose (0.5 cc. pro kilogram) of the product called "Propidon." Propidon is a polyvalent vaccine, containing attenuated strains of Streptococcus, Staphylococcus and pyocyanic Bacillus and frequently used in order to create experimental hyperthermic conditions.

The annexed diagram shows the observed results. On this diagram, the time (in hours) after the administration of the abovementioned bisulphite compund is plotted against the variations of the temperature of the examined dogs. The origin of the ordinates corresponds to the temperature of the dogs, before the administration of the bisulphite compound.

The full line curve shows the variations of the temperature of a dog, to which a dose, as hereinabove specified, of "Propidon" was administered, without any subsequent administration of the bisulphite compound.

The dash and dot line curve shows the variations of the temperature of a dog, to which were successively administered a dose of "Propidon" and 0.5 gr. of the bisulphite compound.

Finally, the dash line curve shows the variations of the temperature of a dog, to which were successively administered the same dose of "Propidon" and 1 gr. of the bisulphite compound.

As shown by these curves, the bisulphite compound inhibits greatly the hyperthermic conditions built up by the administration of "Propidon."

2. Bacteriostatic properties

The lower limit of the bacteriostatic activity of the bisulphite compound, obtained from antipyrine aldehyde and para-amino-benzene sulfonamide, was determined in specific conditions and compared with the lower limit of bacteriostatic activity shown by pure para-amino-benzene sulfonamide in the same experimental conditions.

The three following solutions were used during the tests:

1. A solution containing 1 gr. of the bisulphite compound in 100 cc. of ordinary meat-broth (percentage of antipyrin aldehyde: 0.62%; percentage of sulfanilamide: 0.38%);
2. A 0.62% solution of antipyrin aldehyde in ordinary meat-broth;
3. A 1% solution of para-amino-benzene sulfonamide in ordinary meat-broth.

All these solutions were sterilized on a Zeiss filter. The concentration of 1% was the actual limit of the tests, as the 1% para-amino-benzene sulfonamide solution is a saturated solution.

At a concentration of 0.62%, the antipyrin aldehyde does not inhibit the growth of the tested species, whereby this latter compound may be considered as being free of any effect on the results indicated in the following table:

| Used Species | Sensitivity of the Species | Remarks |
| --- | --- | --- |
| Streptococcus viridans 960₁ | no | The species grows in the presence of 1% sulfanilamide or bisulphite compound. |
| Anhemolytic 85a₃ | no | idem. |
| Hemolytic Hop | no | idem. |
| Viridans Hop | yes | The growth is inhibited in the presence of 7% sulfanilamide and 5% bisulphite compound. |
| Enterococcus 85a₁ | no | The species grows in the presence of 1% sulfanilamide or bisulphite compound. |
| Pneumococcus Hop | yes | The sensitivity of the species is very high, but the lower limit is not clearly defined. |
| Pyocyanic Bacillus Hop | yes | even in the presence of 1% bisulphite compound, the growth of the species is completely inhibited. |
| Staphylococcus pus X₂₆ | no | Normal growth in the presence of 1% sulfanilamide or bisulphite compound. |
| pus M26 | no | idem. |
| pus D26 | yes | The species grows in the presence of 1% sulfanilamide, but growth is inhibited in the presence of 0.5 to 1% bisulphite compound. |
| pus 96a₁ | yes | idem. |
| white Hop | yes | idem. |
| blond Hop | yes | idem. |
| Oxford | yes | In the presence of 7% bisulphite compound, the growth is inhibited, whereas 8% sulfanilamide are necessary to inhibit the growth. |

As a rule, the abovementioned bisulphite compound may be considered as more active on the sensitive species than the para-amino-benzene sulfonamide.

In vitro, the said bisulphite compound has an activity about three times greater than that of the sulfonamide alone, in the same experimental conditions.

Some methods of carrying out the preparation of bisulphite compounds of 1,2,3-trisubstituted pyrazolones Schiff's base will now be described. The examples given are merely illustrative and are not to be construed as limiting the present invention.

Examples 1 to 13 describe the preparation of Schiff's bases from 1,2,3-trisubstituted pyrazolones and a primary amine.

The reaction for the production of these Schiff's bases may be represented as follows:

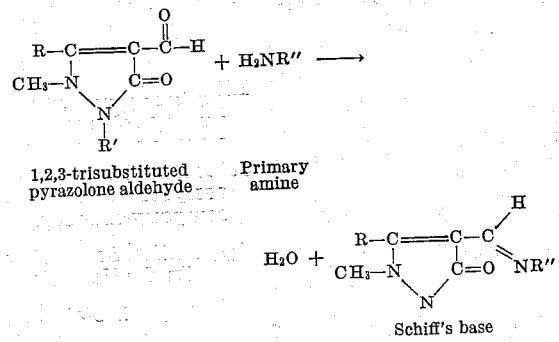

In the above indicated formulae, R, R', R'' have the abovementioned meanings.

Example 1

9.9 gr. of cyclohexylamine are mixed with 21.6 gr. of 1-phenyl-2,3-dimethyl-5-pyrazolone aldehyde and 1 gr. of potassium carbonate. After heating during 30 minutes on a water bath, crystals are obtained, which are centrifuged and recrystallised from ethyl alcohol. These crystals melt at 148° C.

The Schiff's base obtained has the formula $C_{17}H_{23}ON_2$. The quantitative analysis of this Schiff's base gives the following results, compared with the theoretical:

| | C | H | N |
| --- | --- | --- | --- |
| Calculated | 72.69 | 7.79 | 14.13 |
| Found | 72.62 | 7.7 | 14.46 |

Example 2

0.93 gr. freshly distilled aniline are mixed with 2.16 gr. of 1-phenyl-2,3-dimethyl-5-pyrazolone aldehyde and 1 gr. potassium carbonate. After heating during 30 minutes on a water bath and cooling, crystals are obtained which are recrystallised from ethyl alcohol and subsequently from benzene.

The Schiff's base obtained has the formula $C_{18}H_{17}ON_3$ and melts at 152° C. The quantitative analysis gives the following results, compared with the theoretical:

| | C | H | N | M. W. |
| --- | --- | --- | --- | --- |
| Calculated | 74.22 | 6.08 | 14.45 | 280 |
| Found | 74.20 | 5.88 | 14.43 | 291 |

Example 3

26.2 gr. of 1,3-diphenyl-2-methyl-5-pyrazolone aldehyde are heated with 9.3 gr. freshly distilled aniline, in the presence of 5 gr. of dry potassium carbonate. One proceeds subsequently as described in Example 2.

The Schiff's base obtained has the formula $C_{23}H_{19}ON_3$ and melts at 140° C. It contains 12.17% of nitrogen, whereas the theoretical amount of nitrogen is 11.89%.

Example 4

10.7 gr. of ortho-toluidine are vigorously mixed with 21.6 gr. of 1-phenyl-2,3-dimethyl-5-pyrazolone aldehyde and 1 gr. of potassium carbonate. After heating on a water bath during 30 minutes and cooling, the crystals obtained are centrifuged and recrystallised from ethyl alcohol. The yield amounts to 75%.

The Schiff's base obtained has the formula $C_{19}H_{19}ON_3$ and melts at 192° C.

The quantitative analysis gives the following results, compared with the theoretical:

|  | C | H | N | M.W. |
|---|---|---|---|---|
| Calculated | 74.45 | 6.22 | 13.77 | 305 |
| Found | 74.56 | 6.35 | 13.79 | 306 |

Example 5

14.4 gr. of naphthylamine are mixed with 21.6 gr. of 1-phenyl-2,3-dimethyl-5-pyrazolone aldehyde. After addition of ethyl alcohol in order to obtain a complete dissolution, the solution obtained is heated under reflux during 2 hours. After cooling, the crystals are filtered, centrifuged and recrystallised from ethyl alcohol.

The Schiff's base obtained melts at 97–98° C.

Example 6

2.16 gr. of 1-phenyl-2,3-dimethyl-5-pyrazolone are dissolved in 10 cc. ethyl alcohol. To the solution obtained are added 1.53 gr. of para-amino salicylic acid dissolved in 10 cc. ethyl alcohol. By mixing the two above-mentioned solutions, without heating, a freezing is obtained. The freezed mass is then heated during ¼ hour on a water bath, in order to dissolve completely the reagents into the solvent. By cooling, a first fraction of yellowish crystals is obtained, said crystals melting at 150–180° C. Recrystallised from ethyl alcohol, these crystals melt at 190° C.

If heating is continued, orange-yellowish crystals are obtained, these crystals melting between 250 and 255° C. Recrystallised from ethyl alcohol, the latter crystals melt at 265–267° C. with decomposition.

The analysis shows that the latter crystals correspond to a compound containing one mol. of para-amino-salicylic acid and one mol. of antipyrine aldehyde.

Example 7

1.8 gr. of 1-phenyl-2,3-dimethyl-5-pyrazolone aldehyde are dissolved in 15 cc. of water. To the solution obtained are added 0.8 gr. of para-amino-salicylic acid. By mixing the reagents without heating, a salt is obtained which melts at 190° C. By subsequent heating, the Schiff's base melting at 265–267° C. is obtained.

Example 8

2.016 gr. of 1-phenyl-2,3-dimethyl-5-pyrazolone are mixed with 1/100 mol. of para-amino-benzoic acid. The crystalline precipitate obtained is centrifuged and recrystallised from ethyl alcohol. The Schiff's base obtained melts at 200° C.

Example 9

10.9 gr. of para-amino-phenol are dissolved in ethyl alcohol. To the solution obtained is added an alcohol saturated solution of 21.6 gr. antipyrine aldehyde. The two mixed solutions are heated under reflux during two hours. After cooling, the yellow crystals obtained are centrifuged and recrystallised from ethyl alcohol. These crystals melt at 232–233° C. The Schiff's base obtained has the formula $C_{18}H_{17}O_2N_3$.

The quantitative analysis gives the following results, compared with the theoretical:

|  | C | H | N |
|---|---|---|---|
| Calculated | 70.35 | 5.53 | 13.68 |
| Found | 69.53 | 5.58 | 13.29 |

Example 10

13.6 gr. of para-phenetidine, 21.6 gr. of 1-phenyl-2,3-dimethyl-5-pyrazolone aldehyde and 10 gr. of potassium carbonate are mixed and heated during two hours. After cooling, the crystals obtained are centrifuged and recrystallised from ethyl alcohol.

The Schiff's base obtained has the empirical formula $C_{10}H_{21}O_2N_3$ and melts at 163° C.

The quantitative analysis of this Schiff's base gives the following results, compared with the theoretical:

|  | C | H | N | M.W. |
|---|---|---|---|---|
| Calculated | 71.64 | 6.27 | 12.53 | 335 |
| Found | 71.26 | 6.41 | 12.43 | 338 |

Example 11

Equimolecular quantities of 4-amino-antipyrine and antipyrin aldehyde are heated. In the presence of ethyl alcohol the Schiff's base precipitates. The crystals obtained are centrifuged and recrystallised from ethyl alcohol.

The Schiff's base obtained has the formula $C_{23}H_{27}O_2N_5$ and melts at 224–225° C.

The quantitative analysis of this Schiff's base gives the following results, compared with the theoretical:

|  | C | H | N | M.W. |
|---|---|---|---|---|
| Calculated | 68.82 | 5.74 | 14.45 | 401 |
| Found | 68.98 | 6.00 | 13.59 | 438 |

Examples 12 and 13 describe the preparation of bisulphite compounds of 1,2,3-trisubstituted pyrazolone Schiff's bases, from the bisulphite compounds of the aldehyde of these pyrazolones.

The reaction for the production of said bisulphite compounds, according to the Examples 12 and 13, may be represented as follows:

Bisulphite compound of 1,2,3-trisubstituted pyrazolone aldehyde + Primary amine →

Example 12

3.20 gr. of the bisulphite compound of 1-phenyl-2,3-dimethyl-5-pyrazolone aldehyde are dissolved in 20 cc. of cold water. To the solution obtained are added, while mixing and dropwise, 0.93 gr. freshly distilled aniline. After concentration of the resulting solution a crystalline mass is obtained, from which the crystals are separated, centrifuged and recrystallised. These crystals melt at 130–140° C. The yield amounts to 73%.

*Example 13*

2.16 gr. of 1-phenyl-2,3-dimethyl-5-pyrazolone aldehyde are dissolved in 3.5 cc. of a 2.92 N solution of sodium bisulphite. To the resulting solution of bisulphite compound are added 0.93 gr. of aniline, as in Example 12. After heating on a water bath during ¼ hour, an homogenous solution is obtained, which is concentrated in vacuo. The crystals obtained melt at 130° C. with decomposition.

Example 14 describes the preparation of a bisulphite compound of the Schiff's base of a 1,2,3-trisubstituted pyrazolone, the three reagents being successively brought together.

*Example 14*

To a mol. of 1-phenyl-2,3-dimethyl-5-pyrazolone aldehyde are successively added, a mol. of para-aminobenzene sulfonamide and a corresponding amount of a 2 N aqueous solution of natrium bisulphite. The resulting mixture is heated during 2 hours at 90° C., whereby a clear solution is obtained, which is concentrated in vacuo. The crystals obtained are recrystallised from water.

The bisulphite compound obtained has the empirical formula $C_{18}H_{19}O_6S_2Na$ and contains 13.19% S, whereas the theoretical percentage of sulfur is 13.50%.

The pharmacodynamic properties of this particular bisulphite compound were described hereinabove.

Examples 15 and 18 describe the preparation of bisulphite compounds by reacting natrium bisulphite with a Schiff's base of a 1,2,3-trisubstituted pyrazolone.

The reaction for the production of such bisulphite compounds may be represented as follows:

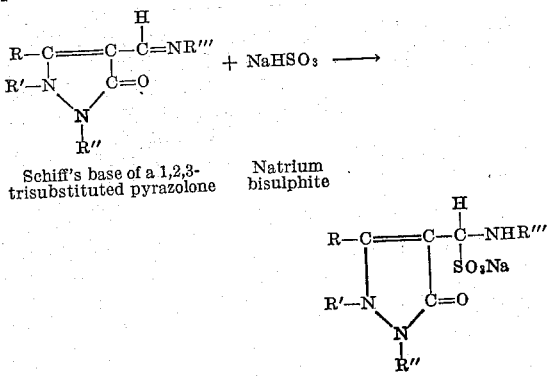

Schiff's base of a 1,2,3-trisubstituted pyrazolone    Natrium bisulphite

*Example 15*

1 gr. of 1-phenyl-2,3-dimethyl-4-benzimino-5-pyrazolone is dissolved into 13 cc. of ethyl alcohol. To the resulting solution 1 mol. of natrium bisulphite, in concentrated solution, is added. The solution is concentrated in vacuo at a low temperature, until the first crystals are formed. By cooling, the desired bisulphite compound is first obtained. After centrifuging, this compound melts at 170–180° C. with decomposition and is soluble in ethyl alcohol and water. A second fraction precipitates subsequently and comprises unreacted natrium bisulphite.

*Example 16*

One mol. of 1,3-diphenyl-2-methyl-4-benzimino-5-pyrazolone is treated as described in Example 15. The bisulphite compound obtained melts at 120–125° C. with decomposition.

*Example 17*

One mol. of 1-p-ethoxyphenyl-2,3-dimethyl-4-p-ethoxybenzimino-5-pyrazolone, prepared according to the method of Ridi (Gazz. Chim. Italiana 1947, 77 p. 3–12), is treated as described in Example 15. The bisulphite compound obtained melts at 150° C. with decomposition.

*Example 18*

The Schiff's base, prepared by reacting 1-p-ethoxyphenyl-2,3-dimethyl-5-pyrazolone aldehyde with 4-amino-antipyrin, is treated as described in Example 15.

The bisulphite compound obtained melts at 190° C. with decomposition.

It is understood that the invention is not exclusively limited to the operative methods described above and that modifications can be introduced into these, both as regards the compounds used, the conditions and the proportions of the reagents, without departing from the field of the invention, as it is defined in the following claims.

What I claim is:

A new compound having the following formula:

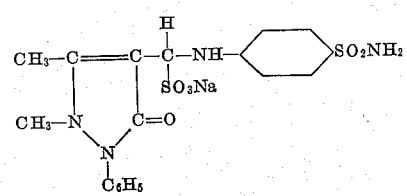

JULES HENRI THEOPHILE LEDRUT.

References Cited in the file of this patent

UNITED STATES PATENTS

| Number | Name | Date |
|---|---|---|
| 1,920,585 | Ott et al. | Aug. 1, 1933 |
| 2,407,600 | Bean | Sept. 10, 1946 |

FOREIGN PATENTS

| Number | Country | Date |
|---|---|---|
| 892,554 | France | Apr. 12, 1944 |

OTHER REFERENCES

Bodendorf et al.: Liebigs Annalen, vol. 563, (1949), pp. 1–11.

Ridi: Chem. Abstr., vol. 36 (1942), pp. 7020–7021.

Ridi: Chem. Abstr., vol. 40 (1946), pp. 7173–7174.

Ridi: Chem. Abstr., vol. 41 (1947), pp. 6561–6563.